United States Patent [19]

Lear et al.

[11] Patent Number: 5,456,868
[45] Date of Patent: Oct. 10, 1995

[54] PHENOLIC RESIN AND CARBON PRODUCTS

[75] Inventors: Anthony M. Lear, Addlestone; Stephen R. Tennison, Weybridge, both of England

[73] Assignee: The British Petroleum Company p.l.c., London, England

[21] Appl. No.: 106,630

[22] Filed: Aug. 16, 1993

[30] Foreign Application Priority Data

Aug. 22, 1992 [GB] United Kingdom .................. 9217914

[51] Int. Cl.$^6$ .............................. B29B 11/10; C08J 9/24; C04B 35/52
[52] U.S. Cl. ..................... 264/29.1; 264/118; 264/122; 264/126; 264/349; 264/DIG. 59; 264/211.2; 264/211.23
[58] Field of Search .................................. 264/29.1, 29.5, 264/29.6, 121, 123, 122, 29.3, 118, 126, DIG. 59, 349, 211.2, 211.23

[56] References Cited

U.S. PATENT DOCUMENTS 2,611,750  9/1952  White ....................................... 264/123
5,059,578  10/1991  Marumo et al. ........................ 264/29.3
5,236,639  8/1993  Sakagami et al. ...................... 264/29.3

FOREIGN PATENT DOCUMENTS 986270   3/1976  Canada ................................. 264/29.4
0254551  1/1988  European Pat. Off. .
0426896A1  5/1991  European Pat. Off. .

*Primary Examiner*—Mathieu D. Vargot
*Attorney, Agent, or Firm*—Nixon & Vanderhye

[57] ABSTRACT

A method of producing a form-stable sintered porous shaped phenolic resin article with continuous open pore structure and high macroporosity, in which a phenolic resin mixture is partially cured to a solid which is then comminuted to give a comminuted resin. The comminuted resin is admixed with water, hexamethylene tetramine and a cellulose ether, and the resulting comminuted resin mixture is formed into a shaped article which is allowed to come to equilibrium with air having a relative humidity of less than 100% at a temperature below 100° C. The shaped article is then sintered to produce a form-stable sintered porous product.

6 Claims, No Drawings

PHENOLIC RESIN AND CARBON PRODUCTS

The present invention relates to porous phenolic resin and carbon articles with a continuous open pore structure and very high macroporosity, and to processes for making such articles.

BACKGROUND OF THE INVENTION

It is disclosed in EP 254 551 that porous carbon articles may be made by (a) partially curing a phenolic resin to a solid, (b) comminuting the solid, (c) forming the resulting comminuted solid into a pre-determined shape, (d) sintering the comminuted resin so as to give a form-stable sintered shaped product, and (e) carbonising the sintered shaped product, the temperature and duration of the curing step being selected so as to give a degree of cure sufficient to give a sinterable product.

The process described in EP 254 551 gives porous phenolic resins which can be converted to porous carbon articles by the carbonisation step. While the phenolic resin and carbon articles have moderately high degrees of macroporosity it is sometimes desirable to produce porous phenolic resin and carbon products with a more open pore structure and greater macroporosity than those produced by the process of EP 254 551. In this specification macroporosity is defined as the percentage volume porosity measured by mercury porosimetry (0.003 to 200 μm). Such products may for example be used for catalyst supports or filter media.

DESCRIPTION OF THE INVENTION

We have now developed a method of producing a porous phenolic resin which has a continuous open pore structure.

According to the present invention there is provided a method of producing a porous shaped phenolic resin article with continuous open pore structure and high macroporosity, which comprises:

a) partially curing a phenolic resin mixture to a solid b) comminuting the partially cured resin to give a comminuted resin, c) mixing the comminuted resin with water and hexamethylene tetramine to give a partially cured resin mixture, d) forming the resulting resin mixture into a pre-determined shape, and e) sintering the comminuted resin so as to produce a form-stable sintered product, the temperature and duration of the curing step a), being selected to give a degree of cure sufficient to give a sinterable product characterised in that the partially cured resin mixture also contains a cellulose ether, the pre-determined shape is allowed to come to equilibrium with air having a relative humidity of less than 100% at a temperature below 100° C., and the degree of partial cure is selected to give a phenolic resin having a high macroporosity after sintering.

By "a phenolic resin of high macroporosity" we mean throughout this specification a thermoset phenolic resin which has expanded linearly by more than 5% on sintering from its dimensions after forming. Preferably the phenolic resin of high macroporosity has a macroporosity of at least 45%.

The method of the present invention requires partial curing of a phenolic resin mixture. The degree of cure during the partial curing step is critical. As described in EP-A-254511, the curing must not be so low that the shaped product will melt completely during sintering or carbonisation. However, the degree of cure must be sufficiently low to allow softening during sintering leading to foaming and expansion when the specified additives are present. If the resin is cured to too great an extent, foaming will not occur even if the resin is still capable of sintering.

In order to produce a highly porous foamed structure after sintering, additives must be added to the comminuted resin obtained in step (b) of the process. One additive required is hexamethylene tetramine (commonly known as "hexamine" or "hex"). Suitably, hexamethylene tetramine is present in the mixture from 1 to 10%, preferably from 2 to 8% by weight of the phenolic resin.

The second additive which is added to the comminuted resin in step (b) of the process is a cellulose ether. The preferred cellulose ether is a methyl cellulose sold under the trade name "methocel". Suitably, the cellulose ether is present in the mixture from 1 to 10%, preferably from 2 to 6% by weight of the phenolic resin.

Water is also added to the comminuted resin in an amount sufficient to give a paste or dough which can be formed easily into an appropriate shape, for example by extrusion.

The additives are added to the comminuted partially cured phenolic resin before it is formed into a shaped article. This may conveniently be done by mixing the comminuted resin with the additives and water in a mixer for example a ribbon blade mixer. Hexamine is preferably dissolved in the water prior to adding the hexamine and water to the dry mixture of partially cured resin and cellulose ether.

The partially cured comminuted phenolic resin may be formed into shaped articles by any convenient method. A preferred method is by extrusion through a die.

After the production of the shaped article, e.g. by extrusion, and prior to sintering by heating, the resin articles must be dried by being allowed to come into equilibrium with an atmosphere with a relative humidity of less than 100%, preferably less than 80%, and most preferably between 20% and 80% relative humidity. The equilibration is carried out at a temperature below 100° C., more preferably below 60° C., and is thus distinguished from the drying steps using hot ovens which would normally be used in the preparation of the shaped articles for sintering. Preferably the equilibration step is carried out at temperatures close to normal ambient temperature e.g. 10°–30° C.

The dried resin article is then sintered by heating. During the sintering step, expansion and foaming occurs. This is maximised by rapid heating to temperatures of at least 150° C.

The process of the present invention provides a phenolic resin article with continuous open pore structure and very high macroporosity. Thus according to another aspect of the present invention there is provided a thermoset crush resistant porous phenolic resin article having a macroporosity of at least 45%.

By "crush resistant" is meant the crush strength as measured on a hand held Pfizer hardness tester, with a 6 mm piston on an extrudate of circular cross-section and a diameter of 5 mm, is at least 2 kg wt/mm.

The aforementioned porous phenolic resin articles can be converted into porous carbon articles by carbonization. Thus according to a further aspect of the present invention there is provided a method of producing a porous shaped carbon article with continuous open pore structure and very high macroporosity which comprises:

(a) partially curing a phenolic resin mixture to a solid, (b) comminuting the partially cured resin to give a comminuted resin, (c) mixing the comminuted resin with water and hexamethylene tetramine to give a partially cured resin mixture, (d) forming the resulting partially cured resin mixture into a pre-determined shape, and (e) sintering the comminuted resin so as to produce a form-stable sintered product, and (f) carbonizing the sintered product, the temperature and duration of the curing step (a), being selected to give a degree of cure sufficient to give a sinterable product after step (a) characterized in that the pre-determined shape is formed from a mixture which also contains a cellulose ether, the pre-determined shape is allowed to come to equilibrium with air having a relative humidity of less than 100% at a temperature of less than 100° C., and the degree of partial cure is selected to give a phenolic resin having a high macroporosity after sintering.

The aforementioned process provides a porous shaped carbon article and thus according to a further aspect of the present invention, there is provided a porous shaped carbon article having a macroporosity of at least 45%.

It is preferred that the carbon article has a macroporosity of at least 50%, most preferably in the range of 55–80%.

EXAMPLES

The invention will now be described with reference to the accompanying experiments in which examples of the invention are identified by numbers and comparative tests, not according to the invention, are identified by letters.

It should be noted that extrudate diameters rather than porosities have been measured in some of the examples. Macroporosity as measured by mercury porosimetry is related to extrudate radius by the following equation:

$$\% \text{ POROSITY } P = \frac{\text{Volume of pores in 1g of extracts}}{\text{Total volume of 1g of extrudate}}$$

$$\% \text{ POROSITY } P = 1 - \frac{V_c}{\pi r^2 l}$$

where, $V_c$=skeletal density of carbon as measured by mercury porosimetry (g/ml)

r=extrudate radius l=length of 1 g of extrudate

A relationship of increasing porosity with increasing diameter has been shown experimentally for carbon samples and is used to estimate porosity for some of the samples listed in the Table. Porosities determined in this way are shown in brackets.

COMPARATIVE EXAMPLE A a) Phenolic resin

This shows the effect of using a degree of partial cure sufficient to give a sinterable product but too high to give a product with high macroporosity.

Novolac phenolic resin ground with 2.5 to 3.0% hexamine (sold by BP Chemicals Limited as J10 50 H) was cured at 150° C. by spreading on trays, placing on a trolley and passing through a tunnel oven. The resin took 16 hours to pass through the oven. The solid resin was broken up and re-ground in a jet mill to a fine powder ( parts of this resin powder were mixed in a Winkworth ribbon blade mixer with 4 parts of a cellulose ether sold under the name "Methocel" (Dow Chemicals). Hexamine (BDH)(4 parts) was added dissolved in water (34 parts). All parts are by weight. The resulting dough was extruded into 4mm diameter extrudate using a Russell-Finex EXDFS-100 twin screw extruder (front extrusion). A sample of this extrudate was allowed to come to equilibrium with the ambient laboratory atmosphere at room temperature (20°–25° C.) and then placed directly in an air oven at 150° C. The diameter was 3.94 mm (similar to the extruded diameter) and the porosity was 35% as measured by mercury porosimetry. Samples of the extrudate were also allowed to equilibrate at various controlled humidities at room temperature and then placed directly in an air oven at 150° C. for 2 hours. The diameters are shown in the table and are all similar to the extruded diameter (4 mm).

b) carbon

A sample of the extrudate dried over silica gel was carbonized under nitrogen to 550° C. The resulting carbon extrudate had a diameter of 3.33 mm and porosity measured by Mercury porosimetry of 41%.

COMPARATIVE EXAMPLE B

This shows the effect of not adding hexamine to the comminuted resin before forming into a shaped article by extrusion.

Phenolic resin (J10 50 H) was cured at 150° C. by spreading on trays and placing in an oven for 1.5 hours. The resulting solid was broken up and ground in a jet mill to a fine powder. 100 parts of this resin powder were mixed in a Winkworth Z-blade mixer with 4 parts cellulose ether ("Methocel"). Water (47 parts) was then added. The resulting dough was extruded as in Test A. Samples of this extrudate were equilibrated at various humidities at room temperature and then heated to 150° C. as in Test A. Diameters are shown in the Table and are similar or lower than the extruded diameter (4 mm).

COMPARATIVE EXAMPLE C

This shows the effect of adding poly ethylene glycol (molecular weight 6000 (PEG) instead of cellulose ether prior to extrusion.

Phenolic resin (J10 50 H) was cured and ground as in Test B. 100 parts of this resin powder were mixed in a Winkworth Z-blade mixer with 4 parts hexamine and 13 parts PEG, both dissolved in 37 parts water. The resulting dough was extruded as in Comparative Example A. Samples of this extrudate were equilibrated at various humidities and then heated to 150° C. as in Test A. Diameters are shown in the Table and are similar to the extruded diameter (4 mm).

EXAMPLE 1

Phenolic resin (J10 50 H) was cured and ground as in Test B. 100 parts of this resin powder were mixed in a Winkworth Z-blade mixer with 4 parts cellulose ether ("Methocel"). Hexamine (4 parts) dissolved in water (47 parts) was then added. The resulting dough was extruded as in Test A. Samples of this extrudate were allowed to come to equilibrium at room temperature (ca. 20° C.) with air at different relative humidities and then heated to 150° C. as in A. Diameters are shown in the Table. The porosity of one sample (45% relative humidity) as measured by mercury porosimetry was 67%.

COMPARATIVE EXAMPLE D

This shows the effect of using wet extrudate in the sintering step.
a) phenolic resin An experiment was carried out as in Example 1, except that the extrudate was not allowed to come to equilibrium with air with a relative humidity below 80% before being sintered but was fed in its wet state directly to the sintering step (by being placed in an oven at 150° C for 1 hour). The results are shown in Table 1.
b) carbon Phenolic resin was partially cured and ground as in a) above. The phenolic resin powder (100 parts) was mixed in a Winkworth Z-blade mixer with cellulose ether (4 parts). Hexamine (8 parts) dissolved in water (58 parts) was then added. The resulting dough was extruded as in Test A. A sample was immediately heated (in its wet state) to 200° C. at the rate of 300° C./hour and held at 200° C. for 1 hour. The material was then carbonised by heating under nitrogen to 550° C. over 2 hours and holding at 550° C. for 1 hour. The results are shown in the Table 1.

EXAMPLE 2 a) phenolic resin

Phenolic resin (J10 50 H) was cured and ground as in Test B. The resin powder (100 parts) was mixed in a Winkworth Z-blade mixer with 4 parts cellulose ether ("Methocel"). Hexamine (4 parts) dissolved in water (44 parts) was then added. The resulting dough was extruded as in Test A. Samples of this extrudate were equilibrated at various humidities at room temperature and then heated to 150° C. as in Test A. Diameters are shown in Table 1.

It can be seen from Table 1 that for experiments 1 and 2 the highest diameters and hence the highest porosities occur for samples with moisture contents between 20% and 80% relative humidity. Considerable expansion of the extruded diameter has occurred on heating samples in this relative humidity region to 150° C.
b) carbon Samples from Example 2a) above were carbonised by heating under nitrogen to 550° C. over 2 hours and holding at this temperature for 1 hour. Very high porosities were achieved as shown in Table 1.

EXAMPLE 3

This experiment demonstrates the strength of the porous phenolic resin articles of the present invention.

A phenolic resin extrudate having a diameter of 5 mm and a macroporosity of 67% was made in accordance with the procedures described for Examples 1 and 2, with extrudate allowed to equilibrate at 45% relative humidity followed by heating to 150° C. for 2 hours.

The crush strength of the extrudate was measured using a hand held Pfizer hardness tester with a 6 mm piston. The extrudate was crushed across the diameter. The force required was approximately 37 pounds weight.

The porosities given in brackets were obtained by extrapolation from results which had been obtained for the variation of porosity, as measured by mercury porosimetry, for extrudate diameter for carbon materials. Values not given in brackets were obtained directly from mercury porosimetry.

TABLE 1

PHENOLIC RESIN EXTRUDATE DIAMETERS IN mm AFTER EQUILIBRATING AT VARIOUS HUMIDITIES FOLLOWED BY RAPID HEATING TO 150° C.

| EXPERIMENT | | RELATIVE HUMIDITY | | | | | |
|---|---|---|---|---|---|---|---|
| | | 0 | 20 | 45 | 56 | 81 | WET |
| A | | | | | | | |
| RESIN | diam. | 3.93 | 3.99 | 3.99 | 4.18 | 3.98 | 4.02 |
| CARBON | diam. | 3.33 | — | — | — | — | — |
| | poros. | 41 | — | — | — | — | — |
| | poros. | (38) | | | | | |
| B | | | | | | | |
| RESIN | diam. | 3.90 | 3.90 | 3.90 | 3.88 | 3.75 | 3.62 |
| C | | | | | | | |
| RESIN | diam. | 3.92 | 4.08 | 4.08 | 4.07 | 4.05 | |
| 1 | | | | | | | |
| RESIN | diam. | 4.26 | 4.53 | 5.00 | 4.98 | 4.66 | |
| | poros. | | | 67 | | | |
| D | | | | | | | |
| RESIN | diam. | — | — | — | — | — | 3.82 |
| CARBON | diam. | | | | | | 3.18 |
| | poros. | | | | | | 25 |
| | poros. | | | | | | (27) |
| 2 | | | | | | | |
| RESIN | diam. | 4.55 | 5.26 | 5.52 | 5.36 | 4.62 | |
| CARBON | diam. | 4.31 | 5.05 | 5.08 | 4.94 | 4.17 | |
| | poros. | (69) | (76) | (76) | (76) | (66) | |
| | poros. | | | 73 | | | |

We claim:

1. A method of producing a porous shaped phenolic resin article with continuous open pore structure and high macroporosity, said method comprising the steps of:
   (a) partially curing a phenolic resin mixture to a solid, the degree of partial cure being selected to give a phenolic resin having a macroporosity after sintering;
   (b) comminuting the partially cured resin to give a comminuted resin;
   (c) mixing the comminuted resin with water, hexamethylene tetramine and a cellulose ether to give a comminuted resin mixture;
   (d) forming the comminuted resin mixture obtained in step (c) into a shaped article;
   (e) allowing said shaped article to come to equilibrium with air having a relative humidity of less than 100% at a temperature below 100° C.; and
   (f) sintering the shaped article so as to produce a form-stable sintered product.

2. A method as claimed in claim 1 in which the hexamethylene tetramine is mixed in step (c) in an amount of from 1 t 10% by weight of phenolic resin.

3. A method as claimed in claim 1 in which the cellulose ether is present at a concentration of from 1 to 10% by weight of the phenolic resin.

4. A method as claimed in claim 3 in which the cellulose ether is a methyl cellulose ether.

5. A method as claimed in claim 1 in which the sintering step (f) is carried out by rapid heating to at least 150° C.

6. A method of producing a porous shaped carbon article which comprises carbonizing a porous shaped phenolic resin article produced according to the method as claimed in claim 1.

* * * * *